Figure 5:
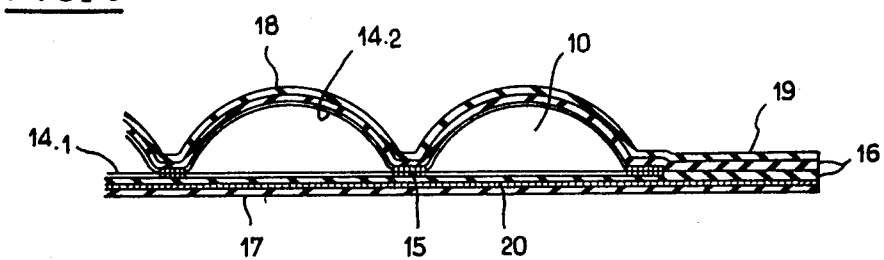

United States Patent [19]

Bac

[11] Patent Number: 4,463,919
[45] Date of Patent: Aug. 7, 1984

[54] PNEUMATIC DEICERS FOR AIRCRAFT

[75] Inventor: Jean-Claude Bac, Le Petit Couronne, France

[73] Assignee: Caoutchouc Manufacture et Plastiques, Levallois-Perret, France

[21] Appl. No.: 384,517

[22] Filed: Jun. 3, 1982

[30] Foreign Application Priority Data

Jun. 3, 1981 [FR] France .............................. 81 10980

[51] Int. Cl.³ .............................................. B64D 15/18
[52] U.S. Cl. ............................................... 244/134 A
[58] Field of Search ........... 244/134 R, 134 A, 134 B, 244/134 E, 219; 66/197, 195; 52/2; 441/129, 40; 139/390; 5/457

[56] References Cited

U.S. PATENT DOCUMENTS

| 2,506,501 | 5/1950 | Harper ............................ 244/134 A |
| 3,307,379 | 3/1967 | Woolley et al. ...................... 66/196 |
| 3,370,814 | 2/1968 | Kageorge et al. ............... 244/134 A |
| 3,623,684 | 11/1971 | Kline ................................ 244/134 A |
| 3,829,353 | 8/1974 | Fisher ................................... 5/457 |

FOREIGN PATENT DOCUMENTS

| 942085 | 2/1974 | Canada .................................. 66/196 |
| 1090516 | 3/1955 | France .................................. 66/196 |
| 36966 | 4/1965 | German Democratic Rep. ... 66/195 |

Primary Examiner—Galen L. Barefoot
Attorney, Agent, or Firm—Antonelli, Terry & Wands

[57] ABSTRACT

Pneumatic deicer with multiple inflatable chambers made of rubberized fabric in which all of chambers (10) or of a group of chambers are made of a double rubberized fabric on its outer faces which form two separate layers (14.1–14.2) which are connected along spaced linear areas (15) which are interknit from one layer to the other to delimit the juxtaposed tubular chambers, characterized by the fact that the interknit linear zones are oriented in the longitudinal direction of the tricot and this double tricot is a Jersey tricot with a transverse extensibility rate which is equal to at least twice its longitudinal expandability.

6 Claims, 7 Drawing Figures

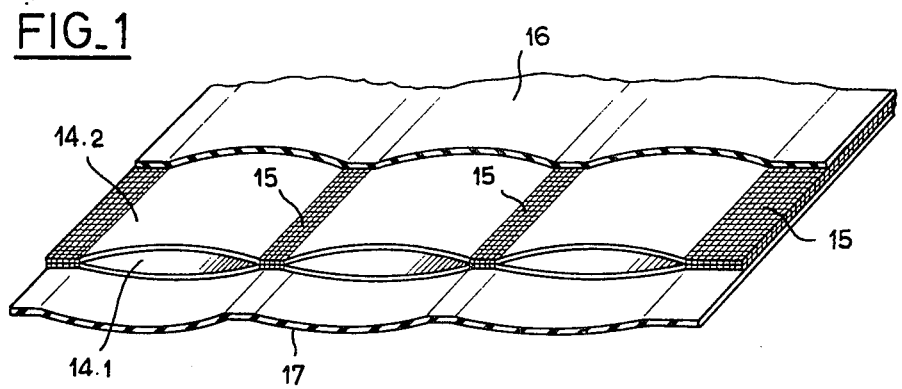
FIG_1
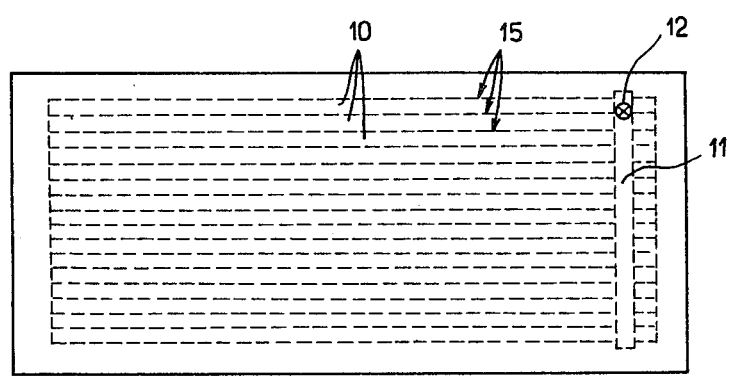
FIG_2
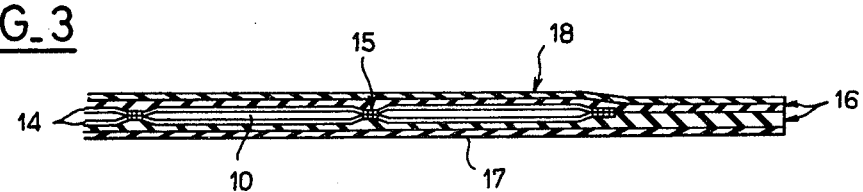
FIG_3
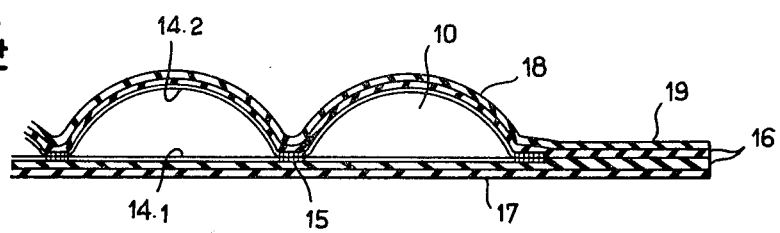
FIG_4

PNEUMATIC DEICERS FOR AIRCRAFT

The invention pertains to deicing boots with multiple inflatable chambers which are made of rubberized fabric and are used to eliminate the ice which forms on certain aircraft surfaces, for instance on the leading edges of the aircraft wings. These deicing boots generally comprise tubular elongated parallel chambers which are connected to an inflation system which makes it possible, by intermittent inflation and deflation, to deform the chambers to shatter the layer of ice which has accumulated on the outer surface of the boot.

In a known type of structure which is illustrated, for example, in French Pat. No. 1.217.416, the tubular chambers of the boot are formed individually, each having a flattened tube consisting of a narrow strip of fabric which is folded longitudinally in order to join its edges together. These chambers are placed parallel to one another and are sandwiched between a base rubberized layer to be attached to the edge of the wing and an elastically deformable rubberized coating layer. This type of structure is complicated and expensive.

Another type of known structure which is illustrated, for example, in French Pat. No. 1.534.111 consists of forming the inflatable chambers by combining two layers of rubberized fabric which are superposed by means of parallel seam lines, with the entire assembly being sandwiched between a base layer and a coating layer. This type of structure is still labor-intensive in manufacture, and the seams which traverse the fabrics represent critical areas which are subject to premature failure due to the fact that they are heavily stressed in service by the expansion of the chambers which are repeatedly inflated and deflated.

In order to avoid these drawbacks, the invention proposes a pneumatic deicer with multiple inflatable chambers in which all of the chambers or a group of chamber [chambers] is made of a double rubberized knit fabric on its outer faces and which form two separate layers which are connected along spaced interknit [interwoven] areas from one layer to the other in order to mark off the chambers; this assembly is characterized by the fact that the interknit linear zones are oriented in the longitudinal direction of the tricot and this double tricot is a Jersey tricot with a transverse extensibility [expandability] rate which exceeds by a factor of at least two its longitudinal expandability rate.

This deicer with multiple inflatable chambers is of particular interest from different points of view. On the one hand, on the level of manufacturing the article can be easily produced by rubberizing the knit fabric, for example by coating or calendering rubber onto the two outer faces of the tricot; this eliminates all of the work involved in making the inflatable chambers since these chambers are directly and automatically obtained on the knitting frame. This greatly reduces the number and duration of manual operations in the manufacture of the article, thus resulting in a lower manufacturing cost. During the rubberizing of the fabric, it is possible to offset the rubber coating layers and connect them on the rim [edge] of the fabric in order to obtain the tight sealing areas.

In operation, the deicer is secured by one of its faces to the surface to be deiced, generally by glueing [can also be "sticking"]. This attachment has the effect of blocking [can also be "clamping", "locking"] the interior face of the deicer and making it expandable in all directions. When the chambers are inflated, only the outer face of the deicer is still free to elongate in order to make it possible for the chambers to expand and for the layer of ice which is formed above this outer face to shatter. The fact that a tricot is used which has greater transverse expandability than longitudinal expandability as well as the fact that the areas which connect the two faces of the tricot are oriented longitudinally with regard to the direction of knitting have the effect of allowing greater and easier transverse deformation of the chambers during inflation, and this helps to shatter the ice, without it being necessary to accomplish this expansion by applying a significant air pressure which would involve an increase [in size] which would adversely affect the service life of the device.

On the other hand, the fact that the inflatable chambers are marked off by linear interknit connecting areas makes it possible to have maximum continuity in these connecting areas since these are the same two threads which constitute the distinct layers of the tricot which have just been interwoven in the connecting areas. Consequently, the stresses resulting from the expansion movements to which the walls of the inflatable chambers are subject are divided at the connections among all the interknit meshes, and due to the looped shape of the threads which form these meshes, the stresses are particularly well distributed. Thus these connecting areas no longer represent as critical areas [as in previous designs], and this makes it possible to increase the service life of the article.

For these pneumatic deicers, to make the deicing process effective it is of interest for the adjacent chambers to be as close together as possible. To do this, it is advantageous for the linear interknit connecting areas of the layers to extend transversely over only a small member of longitudinal rows of tricot.

The width of these connecting areas can be limited to approximately two-five adjacent longitudinal rows of meshes. With such narrow connecting areas and by ensuring that the rubberization of the outer faces of the tricot does not infiltrate into these connecting areas, it is also possible to ensure that these areas are not sealed in the transverse direction so as to allow the inflation air to diffuse from one chamber to another. In this way all of the chambers or of a group of chambers can be connected to the inflation system by a single valve which is connected to only one of the chambers, with the other chambers being inflated by transverse diffusion of the air through the connecting areas. Alternatively, if the connecting areas are sealed or are not sufficiently permeable transversely to allow this diffusion to the extent that is desirable, the various longitudinal chambers can be connected at any point over their length to a chamber or transverse feed channel which is connected to them by appropriate openings. In the connecting areas it is thus possible to reserve transverse communications passages between the adjacent chambers.

The material of the textile used for this double tricot, the fineness [can also be "style, strength"] and nature of the thread, the fineness of the mesh as well as the resulting characteristics of the tricot which is obtained (such as its unit weight, degree of expandability, etc.) can obviously vary throughout the range of the available devices. As an indicative example only, good results have been obtained in the case of deicers with a Jersey tricot with a 66–110 denier polyamide thread; this tricot has approximately 11 longitudinal columns of meshes/cm and 12 transverse rows of meshes/cm.

Prior to coating with rubber, this tricot had a weight on the order of 250 g/m² and an elongation rate under 20 daN of 40% in the longitudinal direction and 105% in the transverse direction. The transverse width of chambers 10 was on the order of 30 mm, and the width of the connecting areas was approximately 2 mm.

Such a tricot can be produced on a circular knitting frame, of a type which is known per se, with linear connecting areas which extend in the longitudinal direction of the tricot. The spacing of these connecting areas, i.e., the width of the inflatable chambers as well as the width of the connecting areas, can be selected arbitrarily to be regular or irregular, depending on the types of devices to be made.

Figure 6:
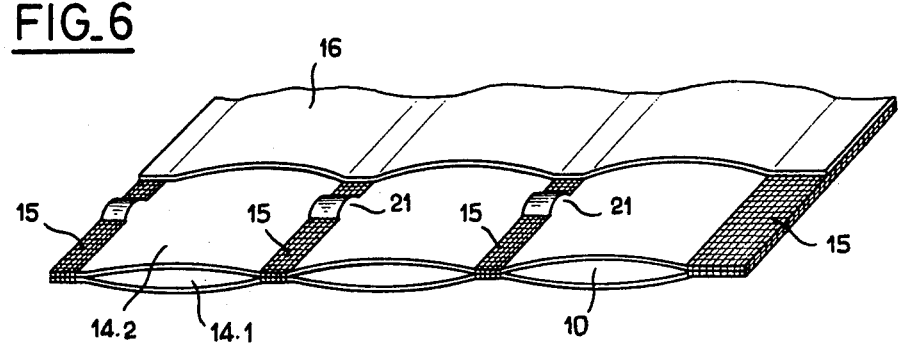
Figure 7:
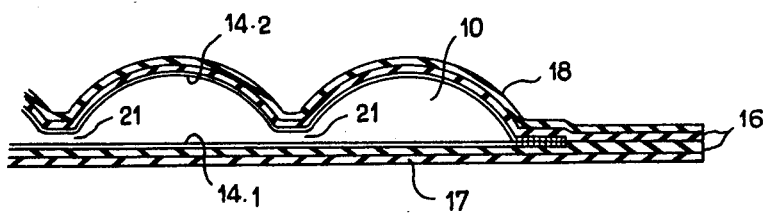

Practical examples of the invention are now described below referring to the enclosed drawings in which:

FIG. 1 is a schematic perspective of a portion of the double rubberized Jersey tricot, FIG. 2 is an overall view of a flattened-out deicing boot, FIG. 3 is a cross-section along line 3—3 of FIG. 2 and FIG. 4 is a cross-section similar to the deicer, the chambers of which are inflated, FIG. 5 is a sectional view of another method of implementation, FIGS. 6 and 7 are perspective and cross-sectional views which illustrate another method of implementation.

The rectangular shape of the deicer, which is illustrated in FIG. 2, is obviously schematic because this general shape can vary depending on the shape of the support surface to be outfitted [with the device], for instance a leading edge of an aircraft wing. In the example which is illustrated, this deicer includes a single group of inflatable tubular chambers 10 which are placed parallel to one another in the longitudinal direction of the boot in such a way that these chambers are parallel to the leading edge of the wind when the boot is mounted. In a way which is known per se, these chambers are connected to a feed chamber 11 which is mounted transversely at one end. Other arrangements are possible. It is possible to have no feed chamber 11 or to have, for example, several groups of parallel tubular chambers on the same deicing boot with or without feed chambers. In all cases, however, the boot is connected by a valve 12 to a device which makes it possible to send the compressed air into chambers 10 and to remove it therefrom since the inflation may simultaneously involve all of the chambers or only some of them, alternatively, depending on the deicing problems encountered.

Inflatable tubular chambers 10 are made of double knit Jersey reinforced fabric 14 which was mentioned above; this tricot forms two distinct layers 14.1-14.2 which are connected at intervals along spaced linear areas 15 which result from the interknitting of the threads of these layers. This tricot is illustrated in FIG. 1 with the walls of the chambers slightly offset, but it is specified that this tricot is essentially flat under normal conditions such that it can be handled and worked like a simple standard fabric. This double tricot is treated in such a way as to ensure good adherence in rubber, and then it is rubberized on its two outer faces by calendering or frictioning with an appropriate elastomer mixture 16, for instance one based on natural rubber or chloroprene. All of the rubberized tricot is then placed between a base layer 17 of rubber and a coating layer 18 of rubber of the same type or of a rubber which is more resistant to abrasion, such as polyurethane, which will form the outer face of the deicing boot.

During the manufacturing process, at periphery 19 of the tricot the coating layers and/or the base layer 17 and coating layer 18 are offset in order to close the ends of chambers 10 and protect the edges of tricot 14. Obviously, the connections and intercommunications for circulation of air are retained, as usual. The entire assembly is then vulcanized and made ready to be attached, for example by glueing, to the support face to be protected against icing. Once the deicer is attached, the inner face is blocked by the rigidity of the support in such a way that during the service only upper walls 14.2 of the chambers are deformed during inflation.

The deicer illustrated in FIG. 5 is similar to the previous one except that a reinforcement fabric 20, which is woven of a fabric which essentially cannot expand in any direction, is interposed between base layer 17 and internal layer 16 of the deicer; this makes the entire internal section, which is secured by glueing to the support surface to be protected against icing, almost inexpandable.

The deicer illustrated in FIGS. 6 and 7 is similar to the first one except that interknit longitudinal connecting areas are interrupted in short segments to retain transverse channels 21 for communication in between adjacent chamber 10. These channels can be used to accelerate the passage of the inflation air from one chamber to the other when the transverse permeability of the connecting areas is inadequate [to do so].

I claim:

1. A pneumatic deicer which comprises multiple, inflatable, tubular chambers made from a double knitted fabric having two separate layers for forming the walls of the chambers, said layers being connected along longitudinally spaced linear areas by interknitting from one layer to the other to delimit juxtaposed tubular chambers, said double-knitted fabric comprising a Jersey knitted fabric in which the ratio of transverse to longitudinal elongation is at least equal to 2 to allow the inflation of the chambers and being rubberized on outer faces of each of said layers; one of the layers being bonded on one side of the double-knitted fabric to a base layer and the other of the layers on the other side of the double-knitted fabric being bonded to a rubberized coating layer.

2. The pneumatic deicer according to claim 1, wherein said base layer is formed of an inexpandable material whereby the one of said layers bonded thereto is substantially inexpansable.

3. The pneumatic deicer according to claim 1, wherein the linear interknit areas connecting the two layers comprise a small number of adjacent rows of knitted mesh, said interknitted areas being air-permeable to allow pneumatic air to diffuse from one chamber to the other.

4. The pneumatic deicer according to claim 1, wherein said interknit linear areas comprise from 2 to 5 rows of adjacent knitted mesh.

5. The pneumatic deicer according to claim 1, wherein an inexpandable reinforcing fabric is interposed between the base layer formed of rubber and the one of said layers.

6. The pneumatic deicer according to claim 1, further comprising transverse passages arranged in the longitudinal spaced linear areas for providing communication between adjacent chambers.

* * * * *